(12) United States Patent
Asai

(10) Patent No.: US 6,669,263 B2
(45) Date of Patent: Dec. 30, 2003

(54) ATTACHMENT DEVICES

(75) Inventor: Takashi Asai, Toyota (JP)

(73) Assignee: Neo-Ex Lab, Inc., Toyota (JP)

( * ) Notice: Subject to any disclaimer, the term of this patent is extended or adjusted under 35 U.S.C. 154(b) by 182 days.

(21) Appl. No.: 09/923,354

(22) Filed: Aug. 8, 2001

(65) Prior Publication Data

US 2002/0026702 A1 Mar. 7, 2002

(30) Foreign Application Priority Data

Aug. 8, 2000 (JP) ........................................ 2000-240317

(51) Int. Cl.$^7$ .............................. B60J 3/00; B23P 11/00
(52) U.S. Cl. ........................................ 296/97.9; 29/434
(58) Field of Search ..................... 29/434, 240, 281.1; 248/289.11, 222.13, 222.51, 223.41, 27.1; 296/97.13, 97.12, 97.11, 97.9, 97.1

(56) References Cited

U.S. PATENT DOCUMENTS

| 5,062,608 A | 11/1991 | Phelps et al. |
| 5,697,140 A | 12/1997 | Crotty, III et al. |
| 5,765,897 A | 6/1998 | Snyder et al. |
| 6,068,323 A | 5/2000 | Brown et al. |
| 6,250,708 B1 | 6/2001 | Kurachi |
| 6,322,284 B1 | 11/2001 | Bonardo et al. |

FOREIGN PATENT DOCUMENTS

FR 2781259 1/2000

*Primary Examiner*—John C. Hong
(74) *Attorney, Agent, or Firm*—Dennison, Schultz & Dougherty

(57) ABSTRACT

Attachment devices are taught that preferably include a coupling portion adapted to couple to an attachment portion of the accessory member and adapted to be received within a mounting hole formed in a panel, and a base portion connected to the coupling portion. The coupling portion is adapted to partially engage an upper surface of the panel along the periphery of the mounting hole when the coupling portion is inserted into and selectively rotated within the mounting hole. Thus, the attachment device is attached to the panel with the panel interleaved between the coupling portion and the base portion. Such attachment devices are preferably utilized to attach a vehicle accessory to a vehicle panel, although other uses of the present attachment devices are naturally contemplated.

13 Claims, 8 Drawing Sheets

ATTACHMENT DEVICES

BACKGROUND OF THE INVENTION

1. Field of the Invention

The present invention relates to attachment devices that can be attached to panels, e.g. roof panels, front header panels and other vehicle body panels. More particularly, the present invention relates to attachment devices that can be attached to the vehicle panel in order to secure accessory members, e.g. a sun visor, a sun visor holder, a mirror, an assist grip and other such members, to the vehicle panel. These attachment devices may be designed, e.g., as a sun visor mounting bracket, a rearview mirror mounting bracket, an assist grip mounting bracket, a sun visor holder unit, and other such devices.

2. Description of the Related Art

Several accessory members are typically attached to a vehicle body panel by utilizing attachment devices. For example, a sun visor is typically attached to the vehicle body panel by utilizing a sun visor mounting bracket that is coupled to a support arm of the sun visor. Such a sun visor mounting bracket is attached to the vehicle body panel using known attachment devices, such as screws, engagement clips or other such fasteners. However, if e.g., a screw, is used to attach the sun visor mounting bracket to the metal vehicle body panel, the screw fastening operation requires special tools, and as a result, requires time consuming and labor intensive work. Thus, there is a long-felt need to develop attachment devices that do not require separate fastening devices.

SUMMARY OF THE INVENTION

It is, accordingly, an object of the present teachings to teach improved attachment devices that overcome one or more problems of known attaching devices.

For example, in one aspect of the present teachings, attachment devices are taught that can be easily attached to a panel without the need for a separate fastening device. In a preferred embodiment of the present teachings, such improved attachment devices are utilized as sun visor mounting brackets.

In one embodiment of the present teachings, attachment devices may be adapted to attach an accessory member to a panel. Such attachment devices may include a coupling portion adapted to couple to an attachment portion of the accessory member and adapted to be received within a mounting hole formed in the panel. Such attachment devices may also include a base portion that is connected to the coupling portion. Preferably, the base portion is adapted to contact a lower surface of the panel when the coupling portion is inserted into the panel mounting hole. The coupling portion is adapted to partially engage an upper surface of the panel along the periphery of the mounting hole when the coupling portion is inserted into and selectively rotated in the mounting hole. Thus, the attachment device can be attached to the panel with the panel interleaved between the coupling portion and the base portion. As a result, the accessory member can be easily attached to the panel by simply inserting the coupling portion of the attachment device into the mounting hole and rotating it within the mounting hole.

In another embodiment of the present teachings, attachment devices are taught that may optionally include a locking means for maintaining the engagement between the coupling portion and the upper surface of the panel. The locking means may comprise a binder means provided on the base portion, and a detent means adapted to prevent rotation of the base portion when the coupling portion is rotated. The base portion is adapted to be partially deformed upon rotation of the coupling portion, so as to change from a non-functional mode to a functional mode, which thereby actuates the binder means. As a result, the accessory member can be easily attached to the panel and locked thereto by simply inserting the coupling portion of the attachment device into the mounting hole and rotating the attachment portion of the accessory member.

In addition, the base portion preferably elastically deforms when the coupling portion is selectively rotated in the mounting hole. As a result, the coupling portion and the detent projection will be squeezed or pressed against the peripheral edges of the mounting hole and the detent hole, respectively. Further, the binder means preferably actuates at that time, so as to maintain base portion in the deformed condition. Thus, the coupling portion is pressed and engaged in the mounting hole and the detent projection is pressed and engaged in the detent hole.

Thus, attachment devices can be reliably attached to a vehicle panel by a simple operation, e.g., by inserting a coupling portion of the attachment device into a mounting hole of the vehicle panel and rotating the coupling portion within the mounting hole. That is, such attachment devices can be attached to the panel without using fasteners and/or special tools. Because this design is superior to known attachment devices, the present attachment devices can be easily and quickly attached to the vehicle panel. Thus, the present attachment devices minimize manual labor required to install vehicle accessories on the vehicle panel, minimize the number of parts necessary to affix an accessory to the panel and thus, provide a substantial improvement over known attachment devices.

In another embodiment of the present teachings, attachment devices are taught that are adapted to attach an accessory member to a panel. A boss may be provided to receive a portion of the accessory member. Further, the boss may be received within a mounting hole defined-within the panel. The boss preferably extends substantially perpendicularly from a base. The base may have a substantially U-shaped exterior shape and a substantially hollow interior. An elastic member preferably connects the boss to the base and thus, the boss can be resiliently supported by the base in a substantially perpendicular relationship to the base. A detent projection may extend substantially perpendicularly from the base portion. For example, the detent projection may be substantially parallel to the boss. The detent projection is preferably designed to be received within a detent hole formed in the panel. Thus, when the boss is received within the mounting hole, the detent projection is also preferably received within the detent hole. In addition, the detent projection preferably fixes the position of the portion of the base connected to the detent projection during the assembly process. For example, the boss can be selectively rotated within the mounting hole and the position of the detent projection does not change, because the position of the detent projection is substantially fixed by the engagement with the detent hole. However, because the boss is elastically connected to the base, the base will elastically deform when the boss is selectively rotated within the mounting hole while the detent projection is held in a fixed position by the detent hole.

The base may also preferably include a releasable lock or binder means. For example, the lock or binder means may be disposed at the respective ends of the U-shaped base. Before attaching the accessory member to the panel, the lock or binder means is preferably in an un-locked or non-functional state. However, when the boss and detent projected are respectively inserted into the mounting hole and the detent hole, the positional relationship between the boss and detent projection will be changed by selectively rotating the boss within the mounting hole while the detent hole substantially fixes the position of the detent projection. That is, the attachment device is preferably designed so that the boss can rotate within the mounting hole, but the detent projection is substantially fixed within the detent hole while the boss is being rotated. The base will elastically deform when the boss is selectively rotated within the mounting hole, due to the elastic connection between the boss and the base. Therefore, the elastic deformation of the base preferably causes the boss to press against the peripheral edges of the mounting hole and the detent projection to press against the peripheral edges of the detent hole.

By further selectively rotating the boss, the base will further deform and cause the lock or binder means to engage. That is, the further deformation of the base will cause the lock members to come together and permit engagement. Therefore, if the lock or binder means is actuated into a locked or functional mode, the base portion will be maintained in the deformed state. Consequently, the lock or binding means will releasably maintain a pressing engagement between the boss and the mounting hole and between the detent projection and the detent hole. As a result, the attachment device can reliably and releasably attach the accessory member to the panel without the need for additional fastening devices and/or the use of special installing tools.

Additional objects, features and advantages of the present invention will be readily understood after reading the following detailed description together with the accompanying drawings and the claims.

DETAILED DESCRIPTION OF THE INVENTION

Figure 1:
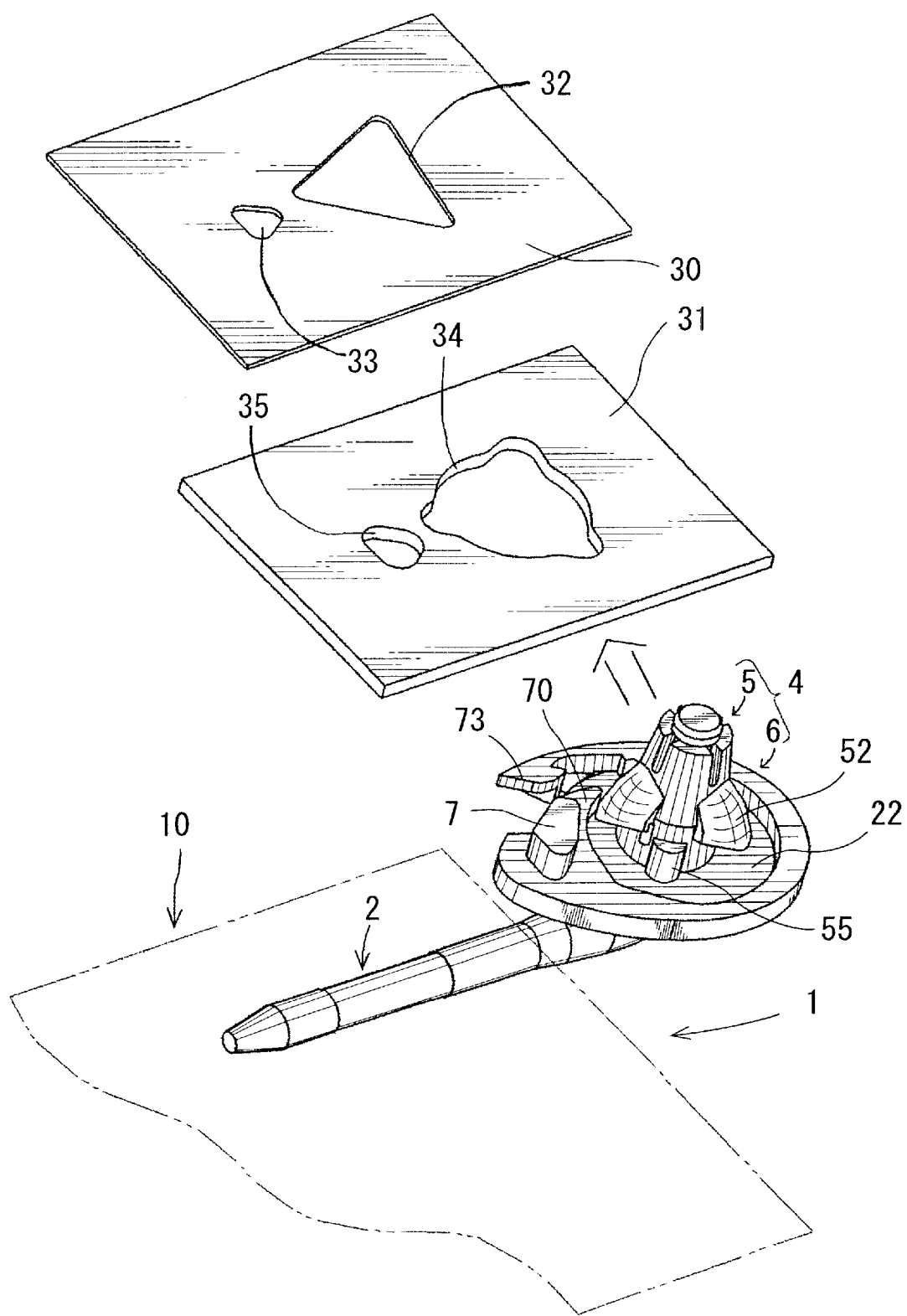
FIG. 1 is an exploded perspective view of a front header panel, a panel lining sheet and a sun visor mounting bracket according to a first representative embodiment of the present teachings, in which the sun visor mounting bracket is coupled to a support arm of a sun visor.

Attachment devices are generally taught that may include a substantially tubular-shaped coupling portion, and a horseshoe-shaped base portion connected to the coupling portion. The coupling portion is preferably adapted to couple to an attachment portion of the accessory member and adapted to be received within a mounting hole formed in the panel. Although the present attachment devices are not limited to any particular use or application, the present attachment devices may preferably be utilized to attach a vehicle accessory, such a sun visor, to a vehicle panel. Moreover, the present attachment devices are preferably integrally combined with the vehicle accessory.

The coupling portion is adapted to partly engage an upper surface of the panel along the periphery of the mounting hole when the coupling portion is inserted into and selectively rotated in the mounting hole. By rotating the coupling portion, the attachment device is attached to the panel with the panel interleaved between the coupling portion and the base portion. The coupling portion may preferably include an engagement block that contacts or engages the upper surface of the panel when the coupling portion is rotated within the mounting hole.

The attachment device may optionally include a locking means for maintaining the engagement between the coupling portion and the upper surface of the panel. The locking means may preferably comprise a binder means provided on the base portion, and a detent means adapted to prevent free rotation of the base portion when the coupling portion is rotated. When the coupling portion is rotated, the base portion is dependently partially distorted or deformed, so as to change from a non-functional or non-locking mode to a functional or locking mode. At the same time, the binder means is actuated, so that the base portion is retained in the locking position. As a result, the attachment devices are reliably retained on the panel. The detent means preferably comprises a detent projection extending substantially perpendicularly from the base portion, which detent projection is intended to be inserted into a detent hole defined with the panel. Further, the detent projection is preferably constructed so as to engage the detent hole when the coupling portion is inserted into the mounting hole. In addition, the binder means preferably comprises a notch and a hook.

The present attachment devices also may optionally include a guide recess that is formed in the coupling portion and is adapted to engage an engagement projection previously formed in the accessory member attachment portion. Thus, the coupling portion can be dependently rotated by rotating the attachment portion of the accessory member. As a result, the attachment devices can be easily attached to the panel by simply rotating the attachment portion of the accessory member.

In a preferred aspect of the present teachings, attachment devices according to any of the embodiments described above and below may be designed as a sun visor mounting bracket. For example, the coupling portion may comprise a tubular boss portion that is integrally (i.e. seamlessly) formed with the base portion. The tubular boss portion is adapted to receive an arm end portion of a support arm of a sun visor. The guide recess formed in the tubular boss portion preferably comprises a circumferentially elongated recess, so that the arm end portion of the sun visor support arm can be rotated within the tubular boss portion over a limited range defined by the length of the recess.

Attachment devices are additionally taught that may include a coupling portion, a base portion connected to the coupling portion, a detent projection formed in the base portion, and a locking means provided on the base portion. The coupling portion is adapted to couple to an attachment portion of the accessory member and adapted to be received within a mounting hole formed in the panel. The detent projection is adapted to be received in a detent hole formed in the panel when the coupling portion is received in the mounting hole. The base portion may elastically distort or deform when the coupling portion is inserted into and selectively rotated within the mounting hole, so that the coupling portion and the detent projection are pressed against the peripheral edges of the mounting hole and the detent hole, respectively. As a result, the attachment devices are attached to the panel by the squeezing or biasing forces of the detent projection and the coupling portion against the detent hole and the mounting hole, respectively. The locking means retains the distorted condition of the base portion. Therefore, the coupling portion and the detent projection are squeezingly retained within the respective holes, to thereby reliably retain the attachment devices on the panel.

Additional representative examples of the present teachings will be described in further detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the above detail description may not be necessary to practice the invention in the broadest sense, and are instead taught merely to particularly describe some representative examples of the invention. In addition, the present teachings naturally may be combined in ways that are not specifically enumerated in order to provide additional useful embodiments of the present teachings.

Two detailed representative embodiments of the present teachings are shown in FIGS. 1 to 11, in which mounting brackets of vehicle sun visors are described as representative examples of attachment devices that can be prepared utilizing the present teachings. However, before describing these two representative embodiments in further detail, a brief explanation of a representative use or application of the two representative embodiments will be provided. As shown in FIG. 12, a vehicle sun visor 1 may preferably comprise a visor plate 10 and an L-shaped metal support arm 2, and may be mounted on a vehicle panel or front header panel 30 by a mounting bracket 4. As will be appreciated, the bracket 4 is rotatably coupled to the L-shaped metal support arm 2 of the sun visor 1. Preferably, the sun visor mounting bracket 4 may be first coupled to a panel lining sheet 31 and then the joined mounting bracket 4 and the panel lining sheet 31 are attached to the front header panel 30. As will be apparent, a receiving hole 34 is defined within the panel lining sheet 31 and a mounting hole 32 is defined within the front header panel 30. Moreover, the panel lining sheet 31 and the front header panel 30 may additionally include a supplemental receiving hole 35 and a detent hole 33, respectively.

First Detailed Representative Embodiment

Figure 2:
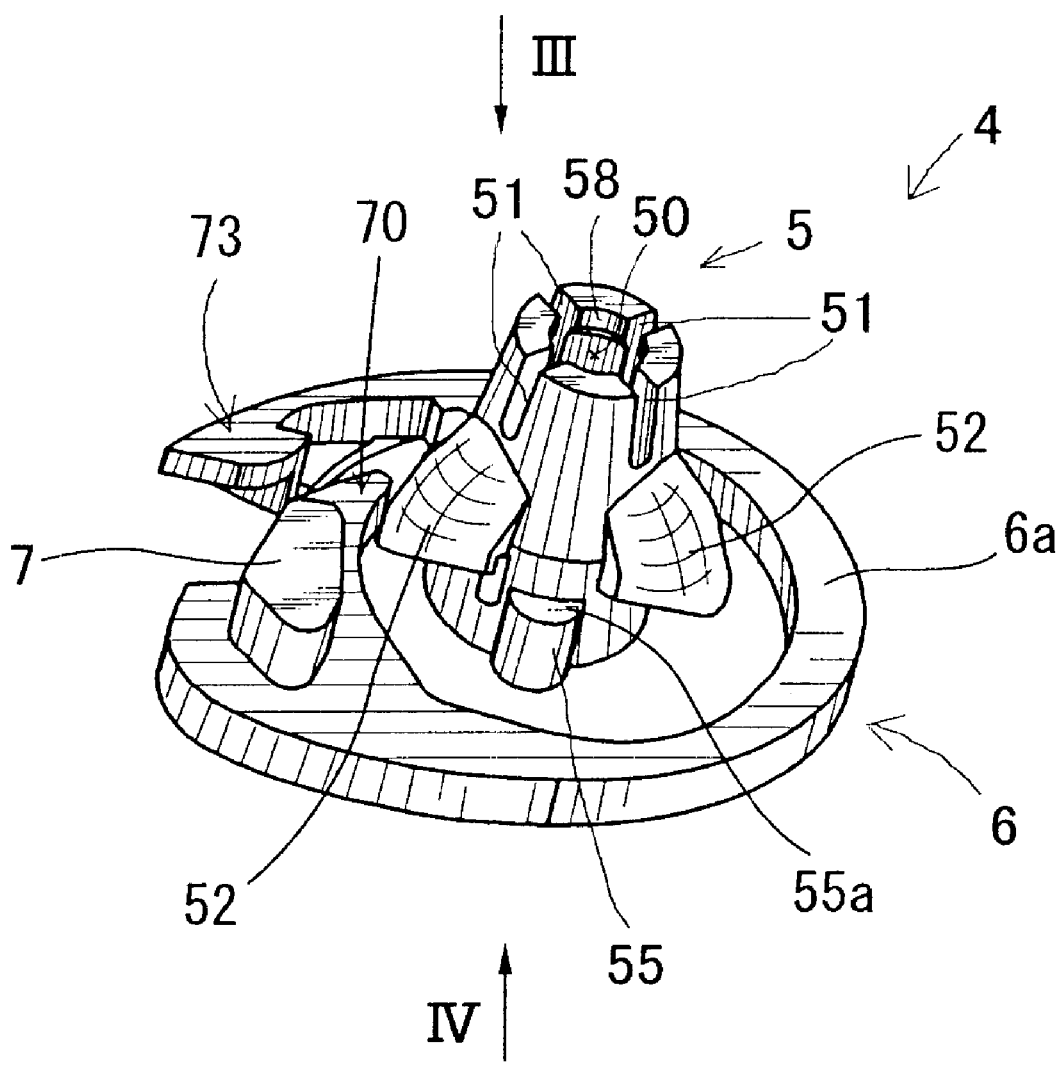
FIG. 2 is a perspective view of the sun visor mounting bracket.
Figure 3:
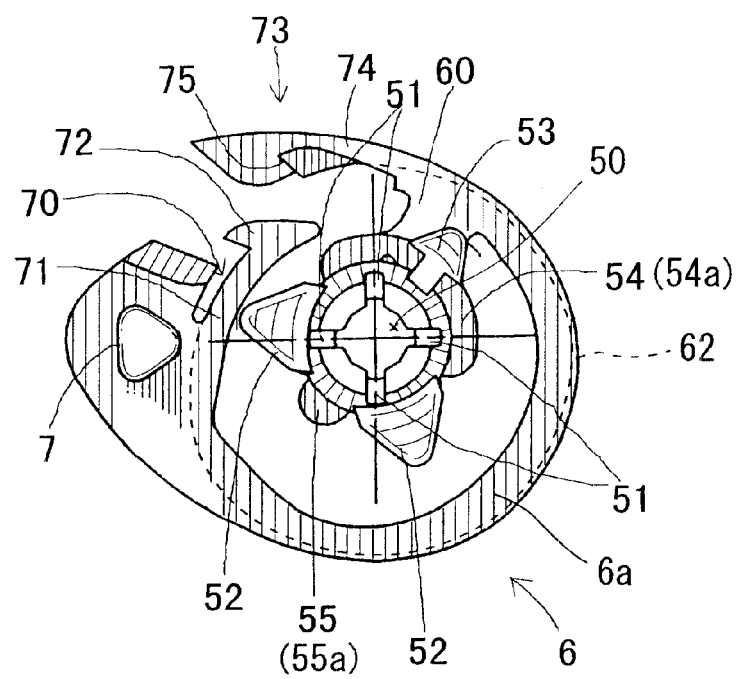
FIG. 3 is a top view in the direction shown by arrow III of FIG. 2.
Figure 4:
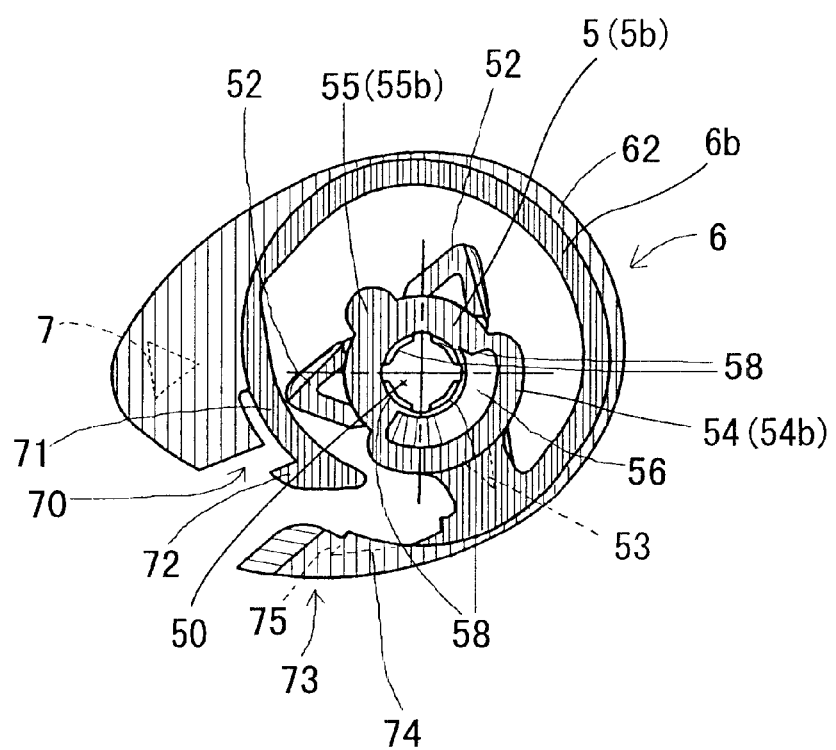
FIG. 4 is a bottom view in the direction shown by arrow IV of FIG. 2.

The first detailed representative embodiment will now described in detail with reference to FIGS. 1 to 10, in which a sun visor mounting bracket 4 is described as a representative attachment device according to the present teachings. As shown in FIGS. 2 to 4, the sun visor mounting bracket 4 may preferably comprise a substantially horseshoe-shaped or U-shaped base portion 6, and a tubular boss portion 5 as a coupling portion. The sun visor mounting bracket 4 may be manufactured, for example, by injection molding a resin material. As best shown in FIG. 3, the boss portion 5 is disposed in substantially the central portion of a U-shape of the base portion 6, and is connected to a portion of the base portion 6 by a connecting portion 60. The boss portion 5 preferably extends perpendicularly (e.g. vertically upward) from the base portion 6.

Figure 5:
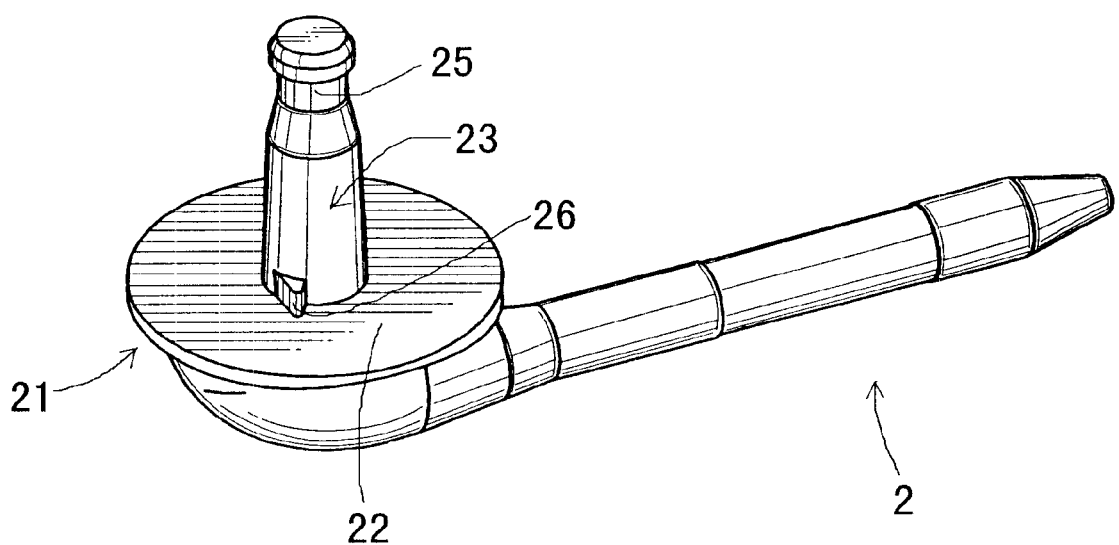
FIG. 5 is a perspective view of the support arm of the sun visor.

The boss portion 5 may include a tapered through bore 50 that is adapted to rotatably receive an attachment portion or tapered vertical end portion 23 of the support arm 2 of the sun visor 1 (see e.g., FIG. 5). Further, as shown in FIG. 2, one or more slits 51 are preferably defined within the boss portion 5. More preferably, four equally spaced slits 51 are defined within the boss portion 5. Therefore, the end portion of the boss portion 5 may elastically flex when the end portion 23 of the support arm 2 is inserted into the through bore 50. Also, as shown in for example FIG. 2, an inner flange 58 is disposed around the split upper edge of the boss portion 5 and is adapted to engage an annular groove 25 formed in the arm end portion 23 of the sun visor support arm 2, so as to prevent the arm end portion 23 from slipping off. Thus, the boss portion 5 may include means for releasably retaining the arm end portion 23 in a reliable manner.

Two stopper blocks 54, 55 may be disposed along the lower periphery of the boss portion 5 and may oppose each other. The stopper blocks 54, 55 may for example constitute a stopper means. In a preferred embodiment, stopper block 54 may have a semi-circular configuration and stopper block 55 may have an elongated bow-shaped configuration in cross section. The stopper blocks 54, 55 are preferably positioned in such a way that their upper surfaces 54a, 55a are substantially parallel with an upper surface 6a of the base portion 6. In addition, the stopper blocks 54, 55 may have respective bottom surfaces 54b, 55b that are substantially coplanar with a bottom surface 5b of the boss portion 5.

Further, the boss portion 5 also may include three integral engagement blocks 52, 53 (two main engagement blocks 52 and one supplemental engagement block 53). The engagement blocks 52, 53 may preferably constitute an engagement means. As best shown in FIG. 3, these engagement blocks 52, 53 may each have a rounded, wedge-shaped, vertical edge, and may be circumferentially and radially disposed around the boss portion 5, equally spaced by 120°, in such a way as to form a rounded triangle in cross section around the boss portion 5. In addition, these engagement blocks 52, 53 preferably have flat lower surfaces that are substantially parallel to the stopper block upper surfaces 54a, 55a and the base portion upper surface 6a. Also, the engagement blocks 52, 53 are preferably positioned in such a way that the distance between their lower surfaces and the stopper block upper surfaces 54a, 55a is substantially equal to or slightly less than the total thickness of the front header panel 30 and the lining sheet 31.

In addition, as shown in FIG. 4, a bow or arc-shaped recess 56 may be defined within the boss portion 5. More preferably, the guide recess 56 may be defined within and extend along the bottom surface 54b of the stopper block 54.

The base portion 6 has a first engagement portion 70 and a second engagement portion 73, which engagement portions 70, 73 may serve as a binder means. Moreover, the binder means may be included within a locking means according to the present teachings, as discussed further below. The first and second engagement portions 70, 73 may be integrally formed at the respective first and second ends of the base portion 6. The first engagement portion 70 preferably comprises an elongated arm 71 that extends substantially concentrically around the boss portion 5, and an engagement hook 72 that is provided on a distal end of the arm 71. The second engagement portion 73 preferably comprises an elongated arm 74 that extends around the boss portion 5 in such a way as to substantially oppose the arm 71, and an engagement notch 75 that is formed in a distal end of the arm 74. Further, the bottom surface 6b of the base portion 6 is preferably substantially parallel with the bottom surface 5b of the boss portion 5 and may be co-planar.

In addition, the first end of the base portion 6 widens outwardly and includes a detent projection 7. The detent projection 7 has a rounded triangular shape in cross section and projects substantially perpendicularly from the base portion 6. Further, the detent projection 7 is preferably substantially parallel with the longitudinal axis of the boss portion 5. Further, as best shown in FIG. 4, an outer peripheral wall 62 extends along substantially the entire length of the lower surface of the base portion 6. As shown therein, this peripheral wall 62 is thickened around the first and second engagement portions 70, 73.

Turning to the support arm 2, as shown in FIG. 5, a guide disk 21 may be provided at the lower end of the arm end portion 23 of the support arm 2 of the sun visor 1. As will be appreciated, the guide disk 21 is adapted to be loosely received in a space enclosed by the peripheral wall 62 of the base portion 6 when the arm end portion 23 of the support arm 2 is inserted into the through bore 50 of the boss portion 5. Also, the arm end portion 23 includes an engagement projection 26 that is positioned adjacent to an upper surface 22 of the guide disk 21. The projection 26 is adapted to slide within the guide recess 56 of the boss portion 5 when the arm end portion 23 of the support arm 2 is inserted into the through bore 50 of the boss portion 5.

Figure 6:
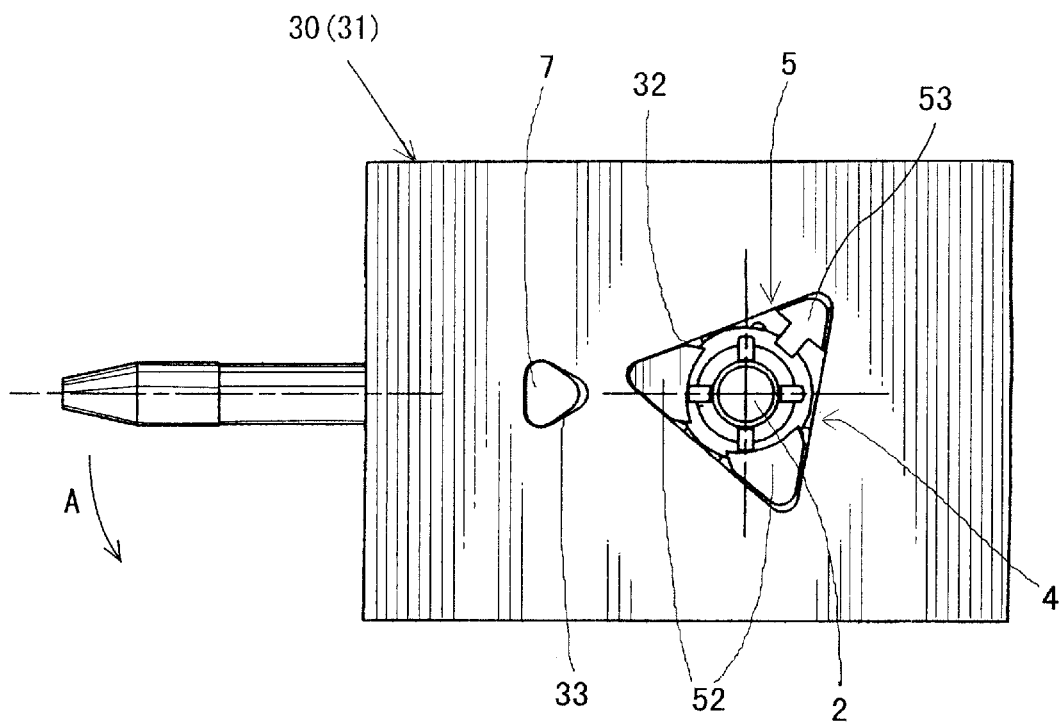
FIG. 6 is a top view of the sun visor mounting bracket coupled to the sun visor support arm, in which it has been positioned on the front header panel but not attached to thereto.

Lastly, the mounting hole 32 and the detent hole 33 of the front header panel 30 may each have a special shape and a special arrangement. That is, as best shown in FIG. 6, the mounting hole 32 preferably has a rounded triangular shape that substantially corresponds to the triangle defined by the outer dimensions of the engagement blocks 52, 53. Therefore, the engagement blocks 52, 53 can closely pass through the mounting hole 32. Further, the outer circumferential surface of the boss portion 5 can partially contact its peripheral edge when the boss portion 5 is inserted into the mounting hole 32. Similarly, the detent hole 33 is preferably defined in such a way as to receive the detent projection 7 when the boss portion 5 is inserted into the mounting hole 32. Also, the detent hole 33 preferably has a rounded triangular shape that substantially corresponds to the shape of the detent projection 7, so as to closely receive the detent projection 7. The detent projection 7 and the detent hole 33 may serve as a detent means according to the present teachings, which detent means may be included within the locking means. In addition, the mounting hole 32 and the detent hole 33 may preferably have a special arrangement that corresponds to the arrangement of the boss portion 5 and the detent projection 7. Further, the receiving hole 34 and the supplemental receiving hole 35 of the lining sheet 31 may be arranged in such a way as to substantially correspond to the mounting hole 32 and the detent hole 33 of the front header panel 30, respectively. Although the receiving hole 34 and the supplemental receiving hole 35 preferably have shapes that substantially correspond to the shapes of the mounting hole 32 and the detent hole 33, any appropriate shapes, such as complementary shapes, may be utilized with the mounting devices of the present teachings.

A representative method for attaching the sun visor 1 to the front header panel 30 by utilizing the first embodiment mounting bracket 4 will now be described.

First, the arm end portion 23 of the support arm 2 of the sun visor 1 is positioned within the tapered through bore 50 of the boss portion 5 of the bracket 4 in such a way that the engagement projection 26 aligns with the guide recess 56 of the boss portion 5. Thereafter, the arm end portion 23 of the support arm 2 of the sun visor 1 is pushed into the tapered through bore 50 of the boss portion 5 of the bracket 4 until the annular groove 25 of the arm end portion 23 engages the inner flange 58 of the bracket boss portion 5. As discussed above, the arm end portion 23 can be easily introduced into the through bore 50, because the boss portion 5 may outwardly spread due to the slits 51 formed therein. Thus, the bracket 4 is attached to the sun visor support arm 2, as shown in FIG. 1. As will be appreciated, the engagement projection 26 is received within the guide recess 56 at this time. In addition, the guide disk 21 is loosely received within the space enclosed by the peripheral wall 62 of the base portion 6. Specifically, the upper surface 22 of the guide disk 21 will contact the bottom surface 5b of the boss portion 5 and the bottom surface 6b of the base portion 6.

After the bracket 4 is attached to the sun visor 1, the bracket 4 is positioned against the panel lining sheet 31 in such a way that the boss portion 5 and the detent projection 7 of the base portion 6 align with the receiving hole 34 and the supplemental receiving hole 35, respectively. Thereafter, the boss portion 5 and the detent projection 7 are inserted into the receiving hole 34 and the supplemental receiving hole 35, so that the bracket 4 is joined with the panel lining sheet 31. As will be appreciated, in this state, the upper surfaces 54a, 55a of the stopper blocks 54, 55 and the upper surface 6a of the base portion 6 contact the lower surface of the panel lining sheet 31.

Subsequently, the combination of the panel lining sheet 31 and the bracket 4 is placed or overlaid on the front header panel 30 in such a way that the boss portion 5 and the detent projection 7 align with the mounting hole 32 and the detent hole 33, respectively. Thereafter, the boss portion 5 and the detent projection 7 are inserted into the mounting hole 32 and the detent hole 33, so that the bracket 4 is pressed against the front header panel 30 with the panel lining sheet 31 interleaved between the base portion 6 and the front header panel 30, as shown in FIG. 6. In this state, the engagement blocks 52, 53 project or extend above the front header panel 30, so that the lower surfaces of the engagement blocks 52, 53 are substantially coextensive or coplanar with the upper surface of the front header panel 30.

Figure 7:
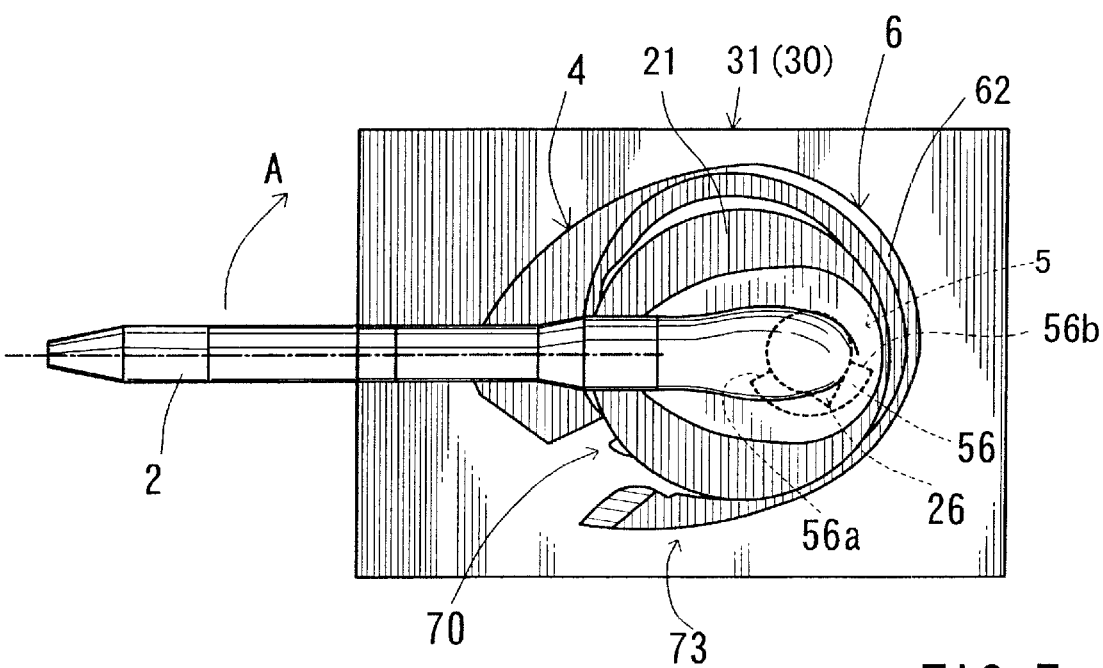
FIG. 7 is a bottom view of FIG. 6.

Thereafter, the support arm 2 is rotated in a direction shown by arrow A, as shown in FIGS. 6 and 7. As will be recognized, when the support arm 2 is rotated, the arm end portion 23 of the support arm 2 can freely rotate around its axis without rotating the boss portion 5 of the bracket 4 until the projection 26 of the support arm end portion 23 contacts a first end surface 56a of the guide recess 56 (FIG. 7). When the support arm 2 is further rotated after the projection 26 contacts the first end surface 56a, the rotational motion of the arm end portion 23 causes the bracket boss portion 5 to rotate in the direction shown by arrow C in FIG. 8. That is, the bracket boss portion 5 is forced to rotate along with the support arm end portion 23. As will be recognized, when the boss portion 5 rotates, the engagement blocks 52, 53 move along the upper surface of the front header panel 30, so as to frictionally engage the upper surface of the front header panel 30 along the periphery of the mounting hole 32, as shown by a solid line in FIG. 8.

Figure 9:
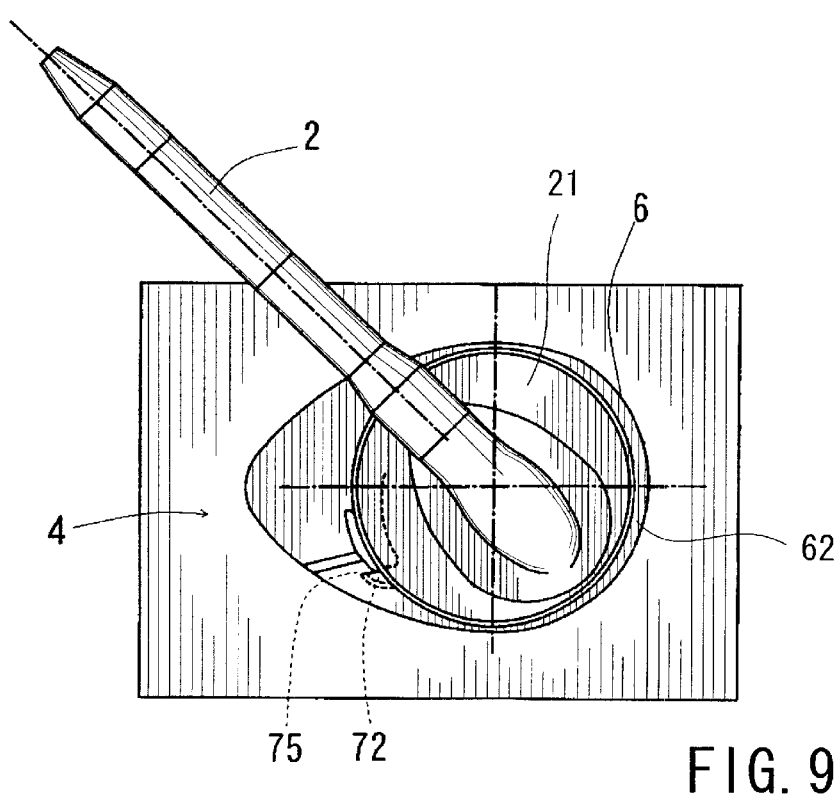
FIG. 9 is a bottom view of FIG. 8.
Figure 10:
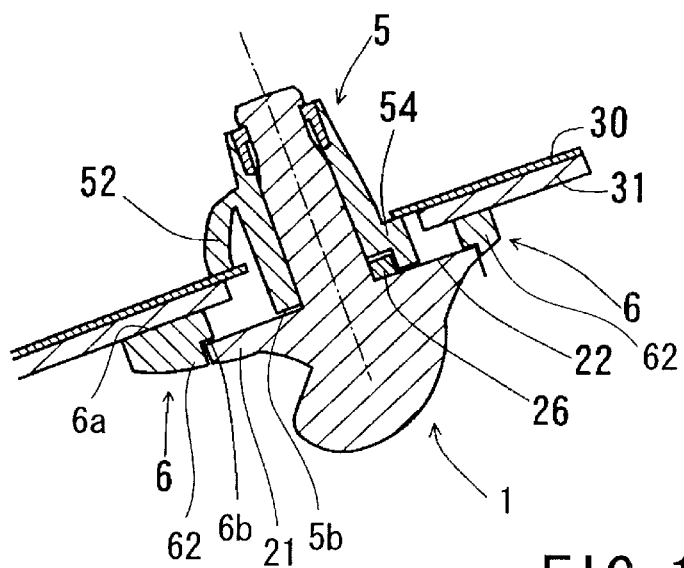
FIG. 10 is a cross-sectional view taken along line X—X of FIG. 8.

As discussed further above, the base portion 6 is connected to the boss portion 5 by the connecting portion 60 and is rotationally restricted by engaging the detent projection 7 with the detent hole 33. Therefore, upon rotation of the boss portion 5, the base portion 6 is concentrically inwardly deformed or elastically contracted, so as to change from a nonfunctional or non-locking mode to a functional or locking mode. As a result, the arm 74 of the second engagement portion 73 moves toward the arm 71 of the first engagement portion 70, to thereby engage the engagement notch 75 of the arm 74 with the engagement hook 72 of the arm 71. Upon engagement of the engagement notch 75 and the engagement hook 72, the base portion 6 is maintained in a looped or locked condition, as shown by a broken line in FIG. 8, to thereby maintain the engagement between the engagement blocks 52, 53 and the upper surface of the front header panel 30. In this state, the space enclosed by the peripheral wall 62 of the base portion 6 contracts, so that the guide disk 21 of the sun visor support arm 2 is closely received within the contracted space, as shown in FIG. 9. Thus, the sun visor mounting bracket 4 is reliably attached to the front header panel 30 with the engagement blocks 52, 53 interleaved between the front header panel 30 and the panel lining sheet 31. Thus, the sun visor 1 is attached to the front header panel 30 as shown in FIGS. 8, 9 and 10.

Figure 8:
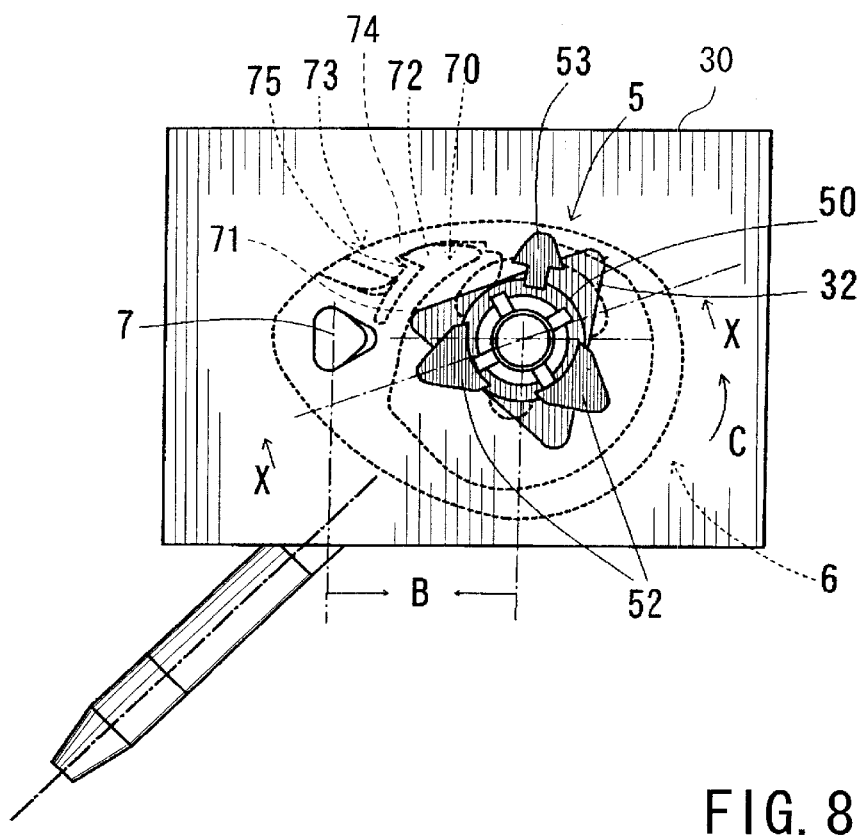
FIG. 8 is a bottom view of the sun visor mounting bracket coupled to the sun visor support arm, in which it has been attached to the front header panel.

In addition, when the base portion 6 elastically contracts upon rotation of the boss portion 5, the detent projection 7 and the boss portion 5 are forced towards each other from the opposite directions as shown by arrow B in FIG. 8. As a result, the detent projection 7 and the boss portion 5 are pressed or squeezed into the peripheral edges of the detent hole 33 and the mounting hole 32, respectively, so as to be retained therein. Thus, the sun visor mounting bracket 4 is also attached to the front header panel 30 by a squeezing or frictional engagement between the detent projection 7 and the detent hole 33 and between the boss portion 5 and the mounting hole 32. Therefore, the engagement blocks 52, 53 can be omitted, if desired. Further, in that case, in order to reliably engage the detent projection 7 and the detent hole 33, as well as the boss portion 5 and the mounting hole 32, the detent projection 7 and the boss portion 5 can preferably include engagement grooves (not shown) that may engage the periphery of the detent hole 33 and the mounting hole 32, respectively.

When the bracket 4 is attached to the front header panel 30, the lower end surfaces of the engagement blocks 52, 53 contact the upper surface of the front header panel 30. Further, the upper surfaces 6a of the base portion 6 and the upper surface 54a and 55a of the stopper blocks 54, 55 contact the lower surface of the panel lining sheet 31. Therefore, the arm end portion 23 of the support arm 2 is effectively prevented from moving vertically or moving along its longitudinal axis. Also, the boss portion 5 and the detent projection 7 are substantially closely received in the mounting hole 32 and the detent hole 33, respectively, and are pressed into the peripheries of the holes 32, 33, respectively. Therefore, the arm end portion 23 of the support arm 2 is effectively prevented from moving laterally or moving across its longitudinal axis. As a result, the sun visor 1 is reliably attached to the front header panel 30.

After the sun visor 1 is attached to the front header panel 30, the support arm 2 can be reversibly rotated until the projection 26 of the support arm end portion 23 contacts the second end surface 56b of the guide recess 56 (FIG. 7). That is, the support arm 2 can be freely rotated within a limited range or between a first angular position, wherein the projection 26 contacts the first end surface 56a of the guide recess 56, and a second angular position, wherein the projection 26 contacts the second end surface 56b of the guide recess 56.

Further, the mounting bracket 4 is preferably integrally formed as a unit. However, parts can be separately manufactured and assembled in order to make the present mounting brackets. Moreover, the mounting bracket 4, and in particular the base portion 6, preferably comprises an elastic resin material.

The sun visor mounting bracket 4 according to the first representative embodiment may exhibit the following effects and advantages. For example, the present sun visor mounting bracket 4 can be easily and reliably attached to the panel 30 by simply rotating the sun visor support arm 2 in one direction. Therefore, time-consuming and labor intensive work is not necessary in order to attach the sun visor 1 to the panel. In addition, this sun visor mounting bracket 4 can be easily attached without using special fasteners, such as screws, and tools, such as screwdrivers.

Various changes and modifications may be made to the present teachings without departing from the scope of the invention. For example, although the mounting hole 32 has a triangular shape in this representative embodiment, it may have a polygonal shape, such as a rectangular shape, an elliptical shape or other such shapes. Similarly, the detent hole 33 may have a circular shape, a polygonal shape, an elliptical shape or other such shapes. Preferably, the detent projection 7 and the detent hole 33 have complementary shapes.

The first end of the base portion 6 can include an engagement recess (not shown) instead of the detent projection 7. As will be easily understood, in such a case, the front header panel 30 may include an engagement projection (not shown) that may engage the engagement recess.

Further, although the arm end portion 23 of the support arm 2 and the boss portion 5 of the bracket 4 may include the projection 26 and the guide recess 56, respectively, the arm end portion 23 of the support arm 2 and the boss portion 5 of the bracket 4 may include the guide recess 56 and the projection 26, respectively.

Second Detailed Representative Embodiment

Figure 11:
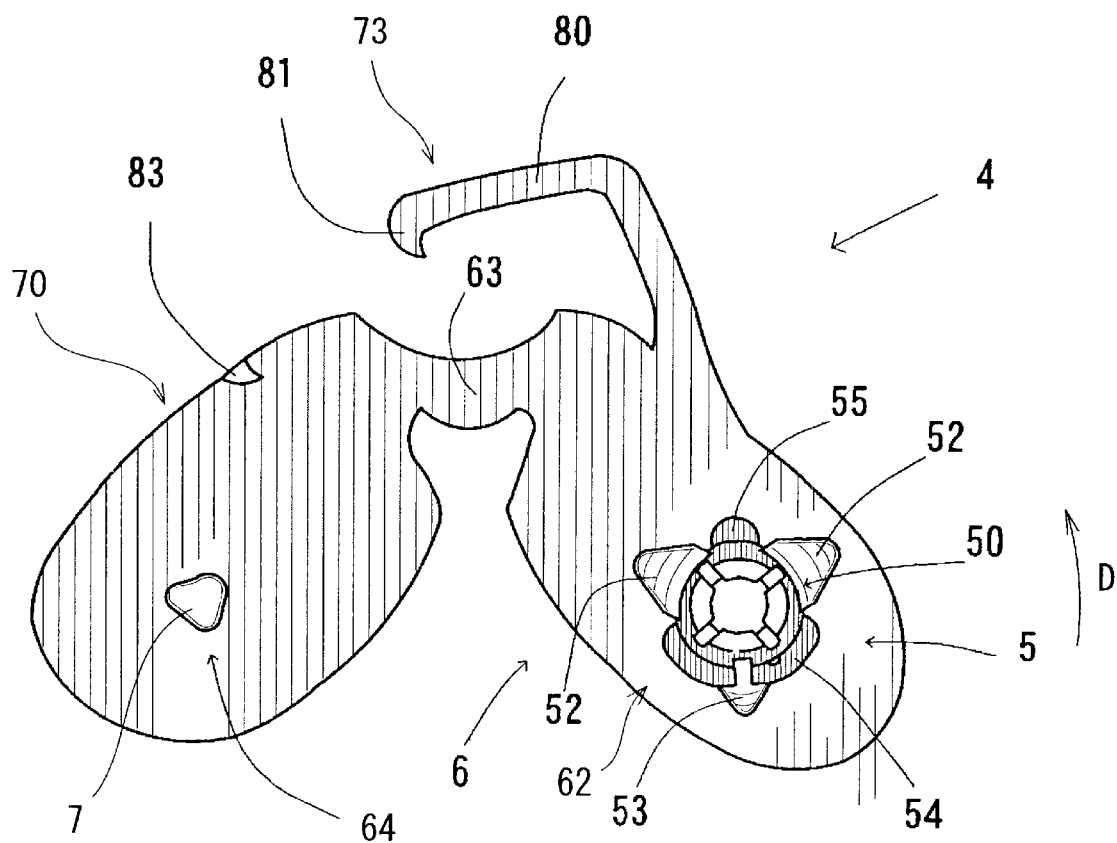
FIG. 11 shows a top view of a sun visor mounting bracket according to a second representative embodiment.
Figure 12:
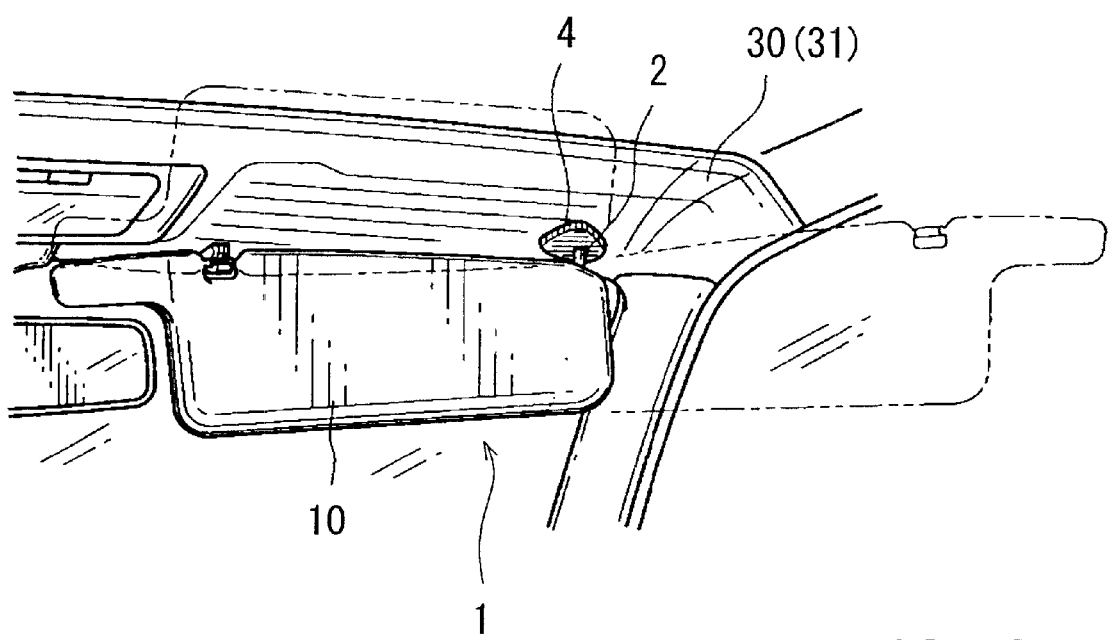
FIG. 12 shows a representative sun visor that incorporates the sun visor mounting bracket of the present teachings.

A second representative embodiment of the present teachings is shown in FIG. 11, which embodiment is related to the first representative embodiment. Therefore, only constructions that are different from the constructions described in the first representative embodiment will be explained. Further, parts that are the same as the first representative embodiment are identified by the same reference numerals in the second representative embodiment.

In the second representative embodiment, the base portion 6 is substantially a V-shaped plate like member and comprises an oval-shaped first portion 62 and an oval-shaped second portion 64, which portions are integrally and flexibly connected to each other by a thin connecting portion 63. The boss portion 5 is disposed at a central portion of the first portion 62 of the base portion 6 and is integrally connected thereto. The detent projection 7 extends from the second portion 64.

The first engagement portion 70 is provided on the second portion 64 and comprises a notch 83 that is formed in the periphery of the second portion 64 of the base portion 6. On the other hand, the second engagement portion 73 is provided on the first portion 62 and comprises an elongated arm 80 that extends over the connecting portion 63, and an engagement hook 81 that is formed in a distal end of the arm 80. As will be appreciated, the engagement hook 81 is adapted to engage the notch 83 when the base portion 6 is appropriately deformed.

In this embodiment, the sun visor 1 may be attached to the front header panel 30 in substantially the same manner as the first representative embodiment. That is, similar to the first embodiment, the bracket 4 is attached to the sun visor 1. The bracket 4 attached to the sun visor 1 is joined with the panel lining sheet 31. Thereafter, the combination of the panel lining sheet 31 and the bracket 4 is attached to the front header panel 30.

When the support arm 2 of the sun visor 1 is rotated in a direction that corresponds to the direction shown by arrow A in FIG. 6, the bracket boss portion 5 is forced to rotate along with the arm end portion 23 of the support arm 2. As a result, the engagement blocks 52, 53 engage the front header panel 30 along the periphery of the mounting hole 32. At the same time, the base portion 6 flexes at the connecting portion 63, so that the arm 80 of the second engagement portion 73 moves toward the first engagement portion 70, to thereby engage the engagement hook 81 with the notch 83. Thus, the sun visor bracket 4 is attached to the front header panel 30, so that the sun visor 1 is attached to the front header panel 30.

Naturally, various changes and modifications may be made to the present teachings without departing from the scope of the invention. For example, although the first and second base portions 62, 64 of the base portion 6 are integrally connected by the connecting portion 63, these portions 62, 64 can be connected by a hinge, a rotatable joint, a spring or other such members. In other words, the base portion 6 may be any member that has at least one flexible or deformable portion.

What is claimed is:

1. An attachment device adapted to attach an accessory member (1) to a panel (30), comprising:
    a coupling portion (5) adapted to couple to an attachment portion (23) of the accessory member and adapted to be received within a mounting hole (32) formed in the panel,
    a base portion (6) connected to the coupling portion, wherein the coupling portion is arranged and constructed to partly engage an upper surface of the panel at the periphery of the mounting hole when the coupling portion is inserted into and selectively rotated in the mounting hole, and
    a locking means for maintaining the engagement between the coupling portion and the upper surface of the panel,
    wherein the locking means comprises a binder means provided on the base portion, and a detent means adapted to prevent rotation of the base portion when the coupling portion is rotated, and wherein the base portion is adapted to be partially deformed upon rotation of the coupling portion, so as to change from a nonfunctional mode to a functional mode, thereby actuating the binder means.

2. An attachment device as defined in claim 1, wherein the coupling portion includes engagement block (52), (53) that are arranged and constructed to engage the upper surface of the panel when the coupling portion is rotated within the mounting hole.

3. An attachment device as defined in claim 2, wherein the mounting hole has a substantially triangular shape, and wherein the coupling portion has three engagement blocks, which blocks are radially disposed about the coupling portion in such a way that their edges substantially correspond to vertices of the triangular mounting hole.

4. An attachment device as defined in claim 3, wherein the edges of the three engagement blocks engage the upper surface of the panel at the sides of the triangular mounting hole when the coupling portion is rotated within the mounting hole.

5. An attachment device as defined in claim 1, wherein the detent means comprises a detent projection (7) extending substantially perpendicularly from the base portion and a detent hole (33) formed in the panel, and wherein the detent projection is arranged and constructed to engage the detent hole when the coupling portion is inserted into the mounting hole.

6. An attachment device as defined in claim 1, wherein the binder means comprises a notch (75) and a hook (72) that are adapted to engage each other when the base portion is deformed.

7. An attachment device as defined in claim 1, wherein a guide recess is defined within the coupling portion and the guide recess is arranged and constructed to engage an engagement projection (26) defined in the accessory member attachment portion, and wherein the coupling portion is adapted to be dependently rotated by rotating the attachment portion of the accessory member.

8. A sun visor mounting bracket comprising the attachment device as defined in claim 1, wherein the coupling portion comprises a tubular boss portion that is integrally formed with the base portion, the tubular boss portion being arranged and constructed to receive an arm end portion (23) of a support arm (2) of a sun visor (1).

9. A sun visor mounting bracket as defined in claim 8, wherein the arm end portion of the sun visor support arm has an engagement projection (26), and the tubular boss portion has a guide recess (56) that is adapted to receive the engagement projection when the arm end portion is coupled to the boss portion, and wherein the boss portion can be dependently rotated by rotating the arm end portion.

10. A sun visor mounting bracket as defined in claim 9, wherein the guide recess comprises a circumferentially elongated recess and the arm end portion of the sun visor support arm is arranged and constructed to rotate within the tubular boss portion over a limited range defined by the length of the circumferentially elongated recess.

11. An attachment device adapted to attach an accessory member to a panel comprising:
    a coupling portion (5) adapted to couple to an attachment portion (23) of the accessory member (1) and adapted to be received within a mounting hole (32) formed in the panel (30),
    a base portion (6) connected to the coupling portion (5),
    a detent projection (7) extending substantially perpendicularly from the base portion, the detent projection being adapted to be received in a detent hole (33) formed in the panel when the coupling portion is received within the mounting hole, and
    a binder means (72), (75) provided on the base portion, wherein the base portion elastically deforms when the coupling portion is inserted into and selectively rotated within the mounting hole, thereby causing the coupling portion (5) and the detent projection (7) to press against the peripheral edges of the mounting hole (32) and the detent hole (33), respectively, and wherein the binder means actuates at the same time, so as to maintain the base portion in a deformed state, which maintains a pressing engagement between the coupling portion (5) and the mounting hole (32) and between the detent projection (7) and the detent hole (33).

12. An attachment device comprising:

a boss adapted to receive an accessory member to be attached to a mounting hole defined within a panel, a substantially U-shaped base disposed substantially perpendicularly to the boss, wherein the base is connected to the boss via an elastically deformable connecting piece, a detent projection extending substantially perpendicularly from the base and being substantially parallel to the boss, means for locking the base in a deformed stated, the locking means being disposed at respective ends of the U-shaped base, wherein the attachment device is arranged and constructed to selectively rotate the boss while maintaining the detent projection in a substantially fixed position, thereby causing the base to elastically deform and engage the locking means and wherein the selective rotation of the boss causes the attachment device to engage a peripheral edge of the mounting hole, thereby attaching the attachment device to the mounting hole.

13. An attachment device as in claim 12, further comprising engagement blocks extending from the boss, wherein the engagement blocks are arranged and constructed to closely pass through the mounting hole when the boss is interested into the mounting hole and then engage the peripheral edge of the mounting hole when the boss is selectively rotated with respect to the detent projection.

* * * * *